United States Patent
Lee et al.

(10) Patent No.: US 11,218,436 B2
(45) Date of Patent: Jan. 4, 2022

(54) METHOD AND APPARATUS FOR DISPLAYING INTERFACE FOR PROVIDING SOCIAL NETWORKING SERVICE THROUGH ANONYMOUS PROFILE

(71) Applicant: KAKAO CORP., Jeju-si (KR)

(72) Inventors: Ji Sun Lee, Seongnam-si (KR); Hyun Young Park, Seongnam-si (KR); Seong Mi Lim, Seongnam-si (KR); Young Min Park, Seongnam-si (KR); Doo Won Lee, Seongnam-si (KR); Eun Jung Ko, Seongnam-si (KR); Jae Lin Lee, Seongnam-si (KR); Kwang Hui Lim, Seongnam-si (KR); Ki Yong Shim, Seongnam-si (KR); Sun Ho Choi, Seongnam-si (KR); Kwang Hoon Choi, Seongnam-si (KR); Hwa Young Lee, Seongnam-si (KR); Jae Gil Lee, Seongnam-si (KR); Kyong Rim Kim, Seongnam-si (KR); Soo Min Cho, Seongnam-si (KR)

(73) Assignee: KAKAO CORP., Jeju-Do (KR)

( * ) Notice: Subject to any disclaimer, the term of this patent is extended or adjusted under 35 U.S.C. 154(b) by 0 days.

(21) Appl. No.: 17/210,508

(22) Filed: Mar. 24, 2021

(65) Prior Publication Data
US 2021/0211401 A1    Jul. 8, 2021

Related U.S. Application Data

(62) Division of application No. 16/999,075, filed on Aug. 21, 2020, now Pat. No. 11,082,391.

(30) Foreign Application Priority Data

Aug. 21, 2019  (KR) .................... 10-2019-0102419
Aug. 21, 2019  (KR) .................... 10-2019-0102422

(51) Int. Cl.
*H04L 12/58*    (2006.01)
*H04L 29/06*    (2006.01)

(52) U.S. Cl.
CPC .............. *H04L 51/32* (2013.01); *H04L 51/04* (2013.01); *H04L 51/10* (2013.01); *H04L 51/16* (2013.01); *H04L 63/0421* (2013.01)

(58) Field of Classification Search
CPC ..... H04L 51/32; H04L 63/0421; H04L 51/10; H04L 51/04; H04L 51/16; H04L 12/58; H04L 29/06
See application file for complete search history.

(56) References Cited

U.S. PATENT DOCUMENTS

| 9,553,878 B2 | 1/2017 | Wu |
| 11,082,391 B2 * | 8/2021 | Lee .................... H04L 51/10 |

(Continued)

FOREIGN PATENT DOCUMENTS

| CN | 104469693 A | 3/2015 |
| CN | 105930408 A | 9/2016 |

(Continued)

OTHER PUBLICATIONS

Apple App Store, Kakao Talk Update v8.4.5, Jul. 2, 2019 <http://apps.apple.com/kr/app/kakaotalk/id362057947>.

(Continued)

*Primary Examiner* — Sargon N Nano
(74) *Attorney, Agent, or Firm* — Cantor Colburn LLP

(57) ABSTRACT

A method of displaying an interface for providing a social networking service (SNS) through an anonymous profile, performed by a user terminal, includes displaying a first list of at least one anonymous chatroom created by a user account for an instant messaging service (IMS) using a first region on a first page in an interface for the IMS, displaying a second list of at least one anonymous profile created to be (Continued)

interlinked with the user account using a first region on a second page in the interface for the IMS, and displaying, in response to an input of selecting any one anonymous profile in the second list, an interface for providing the SNS through the selected anonymous profile.

9 Claims, 7 Drawing Sheets

(56) References Cited

U.S. PATENT DOCUMENTS

| | | | |
|---|---|---|---|
| 2001/0037316 | A1 | 11/2001 | Shiloh |
| 2003/0140084 | A1* | 7/2003 | D'Angelo ........... H04L 12/1403 718/106 |
| 2007/0156726 | A1 | 7/2007 | Levy |
| 2007/0174244 | A1 | 7/2007 | Jones |
| 2008/0021755 | A1 | 1/2008 | Jones et al. |
| 2008/0022211 | A1 | 1/2008 | Jones et al. |
| 2008/0086534 | A1 | 4/2008 | Bardak et al. |
| 2012/0095846 | A1 | 4/2012 | Leverant |
| 2013/0173531 | A1* | 7/2013 | Rinearson ............... G06F 16/80 707/608 |
| 2013/0185368 | A1* | 7/2013 | Nordstrom ............. H04W 4/21 709/206 |
| 2014/0055553 | A1 | 2/2014 | Lee et al. |
| 2014/0244629 | A1 | 8/2014 | Huang et al. |
| 2014/0256288 | A1 | 9/2014 | Allen |
| 2015/0058939 | A1 | 2/2015 | Duong |
| 2015/0256353 | A1 | 9/2015 | Busey et al. |
| 2015/0346937 | A1* | 12/2015 | Mahmoudian-Bidgoly ................ G06F 3/04812 715/753 |
| 2016/0330146 | A1 | 11/2016 | Yoo et al. |
| 2017/0041263 | A1* | 2/2017 | Shekel ................ H04L 63/0414 |
| 2018/0063278 | A1 | 3/2018 | Helled et al. |
| 2018/0068354 | A1* | 3/2018 | Kim ................... G06Q 30/0277 |
| 2018/0144380 | A1 | 5/2018 | Herken |
| 2018/0302357 | A1 | 10/2018 | Cohen |
| 2018/0316733 | A1* | 11/2018 | Chandran ........... H04L 12/1827 |
| 2018/0341387 | A1* | 11/2018 | Segal ...................... H04L 51/32 |
| 2020/0012398 | A1 | 1/2020 | Lee et al. |
| 2020/0137005 | A1* | 4/2020 | Kim ........................ H04L 51/32 |
| 2020/0403815 | A1* | 12/2020 | Kim ........................ H04L 67/02 |
| 2021/0006529 | A1* | 1/2021 | Cho .................... H04L 41/0816 |
| 2021/0160339 | A1* | 5/2021 | Salimi Jazi ............. H04L 67/16 |

FOREIGN PATENT DOCUMENTS

| | | |
|---|---|---|
| CN | 107912082 A | 4/2018 |
| CN | 109716345 A | 5/2019 |
| KR | 10-2013-0089819 A | 8/2013 |
| KR | 10-1420738 B1 | 7/2014 |
| KR | 10-2015-0085272 A | 7/2015 |
| KR | 10-1654261 B1 | 9/2016 |
| KR | 10-2016-0126790 A | 11/2016 |
| KR | 10-2017-0039881 A | 4/2017 |

OTHER PUBLICATIONS

How to do Kakao-open chatting, <https://blog.naver.com/urban0417/220952902974>.

Changed KakaoTalk open chat room super simple profile change, correction method (name, nickname, photo, etc.), add post, <https://blog.naver.com/bluefreewill/221620861604>.

Korean Office Action for KR Application No. 10-2019-0102419 dated Jan. 8, 2021, citing the above reference(s).

Korean Office Action for KR Application No. 10-2019-0102422 dated Jan. 11, 2021, citing the above reference(s).

Taiwanese Office Action for TW Application No. 109128652 dated Oct. 13, 2021.

* cited by examiner

METHOD AND APPARATUS FOR DISPLAYING INTERFACE FOR PROVIDING SOCIAL NETWORKING SERVICE THROUGH ANONYMOUS PROFILE

CROSS-REFERENCE TO RELATED APPLICATION(S)

This application is a divisional application of U.S. patent application Ser. No. 16/999,075, filed on Aug. 21, 2020, which claims the priority benefit of Korean Patent Application No. 10-2019-0102419 filed on Aug. 21, 2019, and Korean Patent Application No. 10-2019-0102422 filed on Aug. 21, 2019, in the Korean Intellectual Property Office, the disclosures of which are incorporated herein by reference for all purposes.

BACKGROUND

1. Field of the Invention

One or more example embodiments relate to a method and apparatus for providing information on social networking service (SNS) activities to a chatroom, and more particularly, to a method of providing, to a chatroom of an instant messaging service (IMS), an SNS using an anonymous profile created to be interlinked with an account for the IMS.

2. Description of the Related Art

An instant messaging service (IMS) refers to a service that enables real-time online communication for two or more users using a network such as the Internet. The major function of the IMS is to deliver informational messages principally using text and emoticons.

However, to satisfy the growing demands of the IMS users for various services, it is necessary to develop a technique for providing new functions not limited to conventional informational message delivery.

Furthermore, the IMS is basically a service for delivering messages between users who are friends in a messenger application. However, as the Internet spreads gradually, intercourse with strangers through various online communities is increasing. A user may feel uneasy to give personal information such as a phone number or a messenger application ID to exchange instant messages with a stranger and need to accept a risk of exposing personal information to a stranger.

Accordingly, there is a need for a method of exchanging instant messages and information on various activities with strangers in a messenger application without exchanging personal information such as a phone number or a messenger application ID.

An open chat service has been launched to address this need. The open chat service provides an open chatroom in which a creator or participants of the chatroom may participate using anonymous profiles. Unique link information may be mapped to the open chatroom, and the participants may participate in the open chatroom through the link information. When a user creates or participates in an open chatroom, the user may create a one-time anonymous profile, other than a general profile for an IMS.

However, the existing service limitedly uses an anonymous profile one time, and does not utilize the anonymous profile actively, for example, to reuse the anonymous profile to participate in another open chatroom or to perform a social networking service (SNS) activity through the anonymous profile.

SUMMARY

An aspect provides a technique for integrating a social networking service (SNS) into an instant messaging service (IMS) and increasing user experience multi-dimensionally by providing a plurality of anonymous profiles through a single user account, in days of relationship formation accelerated through the Internet.

Another aspect provides a technique for providing a plurality of anonymous profiles interlinked with an account for an IMS.

Another aspect provides a technique for providing information on SNS activities performed using an anonymous profile created to be interlinked with an account for an IMS, to a chatroom of the IMS.

Another aspect provides a technique for providing an anonymous profile created to be interlinked with an account for an IMS, and information on SNS activities performed using the profile together.

According to an aspect, there is provided a method of displaying an interface for providing a social networking service (SNS) through an anonymous profile, performed by a user terminal, the method including displaying a first list of at least one anonymous chatroom created by a user account for an instant messaging service (IMS) using a first region on a first page in an interface for the IMS, displaying a second list of a plurality of anonymous profiles created to be interlinked with the user account using a first region on a second page in the interface for the IMS, and displaying, in response to an input of selecting any one anonymous profile in the second list, an interface for providing the SNS through the selected anonymous profile. Each of the at plurality of anonymous profiles may be assigned link information for participation in an anonymous chatroom for 1:1 chat with a corresponding anonymous profile, and each of the at least one anonymous chatroom is accessible through link information of assigned to a corresponding anonymous profile and is a chatroom for 1:1 chat with the corresponding anonymous profile.

The displaying of the interface may include displaying a cover-view interface of the selected anonymous profile.

The displaying of the cover-view interface may include displaying information on the selected anonymous profile using a first region in the cover-view interface, displaying a list of contents posted on the SNS through the selected anonymous profile, using a second region in the cover-view interface, displaying a list of 1:1 chatrooms created in the IMS through link information assigned to the selected anonymous profile, using a third region in the cover-view interface, and displaying an interface for posting contents on the SNS using the selected anonymous profile, in response to an input of selecting a fourth region in the cover-view interface.

The displaying of the interface may include displaying an interface for posting contents on the SNS using the selected anonymous profile.

The contents may include at least one of text, audio, photo, and video.

The method may further include displaying recommended keywords determined by a predetermined method, among keywords associated with anonymous chatrooms provided through the IMS, using a second region on the first page in the interface for the IMS.

The method may further include displaying recommended anonymous chatrooms determined by a predetermined method, among anonymous chatrooms provided through the IMS, using a third region on the first page in the interface for the IMS.

According to another aspect, there is provided a user terminal including a processor configured to display a first list of at least one anonymous chatroom created by a user account for an IMS using a first region on a first page in an interface for the IMS, display a second list of at least one anonymous profile created to be interlinked with the user account using a first region on a second page in the interface for the IMS, and display, in response to an input of selecting any one anonymous profile in the second list, an interface for providing the SNS through the selected anonymous profile. Each of the at least one anonymous chatroom may be assigned link information for participation in a corresponding anonymous chatroom, and each of the at least one anonymous profile may be assigned link information for participation in an anonymous chatroom for 1:1 chat with a corresponding anonymous profile.

According to another aspect, there is provided a control method of a server providing an SNS based on at least one anonymous profile, the control method including receiving a request for creating a first anonymous profile from a first user terminal, creating the first anonymous profile, assigning link information to the first anonymous profile; and creating at least one chatroom which is accessible through the link information assigned to the first anonymous profile and is a chatroom for 1:1 chat with the first anonymous profile. A detail interface for the first anonymous profile outputted on the first user terminal may provide interest data being set for the first anonymous profile and a list of the at least one chatroom in which the first anonymous profile participates.

The link information may be information to be shared by the first user terminal with another user terminal.

The control method may further include replying, if a request corresponding to the link information is received from a second user terminal with which the link information is shared, to the second user terminal with information on the first anonymous profile.

The information on the first anonymous profile may be interest data being set for the first anonymous profile.

The interest data may include at least one of a hashtag and a post associated with the first anonymous profile.

The detail interface for the first anonymous profile may be outputted on the second user terminal, and the interest data may be included in the outputted detail interface.

Posts included in the interest data on the outputted detail interface may be displayed in arrangement in an order of being associated with interest data being set for the first anonymous profile.

A chat creating request through the first anonymous profile may be made by a user input through a detail interface for the first anonymous profile.

According to another aspect, there is provided a server providing an SNS, the server including at least one processor configured to provide an SNS based on information on at least one anonymous profile, wherein the processor may be configured to receive a request for creating a first anonymous profile from a first user terminal, create the first anonymous profile, and create at least one chatroom participated in using the created first anonymous profile, wherein a detail interface for the first anonymous profile outputted on the first user terminal may provide interest data being set for the first anonymous profile and a list of the at least one chatroom participated in using the first anonymous profile.

According to another aspect, there is provided a method of providing an SNS, performed by a user terminal based on at least one anonymous profile, the method including transmitting a request for creating a first anonymous profile to an SNS providing server, and outputting a detail interface for the created first anonymous profile, wherein the detail interface may include interest data being set for the first anonymous profile, and a list of at least one anonymous chatroom which is accessible through link information assigned to the first anonymous profile and is a chatroom for 1:1 chat with the first anonymous profile.

According to another aspect, there is provided a terminal for providing an SNS based on at least one anonymous profile, the terminal including a memory configured to store data for providing an SNS, and a controller configured to provide the SNS based on the stored data, wherein the controller may be configured to transmit a request for creating a first anonymous profile to a message server, and output a detail interface for the created first anonymous profile, wherein the detail interface may include interest data being set for the first anonymous profile, and a list of anonymous chatrooms participated in using the first anonymous profile.

According to another aspect, there is provided a method of providing information on an SNS activity to a chatroom, performed by a server, the method including providing an SNS for each of a plurality of anonymous profiles created to be interlinked with an account for an IMS, receiving information on an SNS activity performed through a first anonymous profile selected corresponding to a chatroom of the IMS, among the plurality of anonymous profiles of a user participating in the chatroom, and providing the information on the SNS activity performed through the first anonymous profile to the chatroom.

The method may further include, if the profile of the user selected corresponding to the chatroom is changed from the first anonymous profile to a second anonymous profile, receiving information on an SNS activity performed through the second anonymous profile, and providing the information on the SNS activity performed through the second anonymous profile to the chatroom.

The SNS activity may include at least one of an activity of posting contents using the first anonymous profile on a posting space corresponding to the first anonymous profile, an activity of editing the posted contents using the first anonymous profile, and an activity of providing a feedback on the posted contents using the first anonymous profile.

The contents may include at least one of text, audio, photo, and video.

The information on the SNS activity may include at least one of profile information on the at least one first anonymous profile, a link to access the SNS activity, and a thumbnail of the SNS activity.

The receiving may include receiving a request for sharing the SNS activity performed through the first anonymous profile, with respect to the chatroom.

The providing may include extracting a participant of the chatroom and transmitting the information on the SNS activity to a terminal of the participant.

The terminal of the participant may display the received information on the SNS activity in the form of a rich feed distinct from a speech balloon in a chat display region of the chatroom.

The terminal of the participant may display the received information of the SNS activity in the form of a list in a pre-allocated region of the chatroom.

In response to an input of selecting the rich feed, the terminal of the participant may display an interface for providing the SNS activity.

The chatroom may include a chatroom to be participated in through link information.

According to another aspect, there is provided a method of providing information on an SNS activity to a chatroom, performed by a user terminal, the method including transmitting, to a server, an SNS request for each of a plurality of anonymous profiles created to be interlinked with an account of a user for an IMS, receiving a list of chatrooms currently participated in using any one of the plurality of anonymous profiles from the server and displaying the list of chatrooms, receiving, from the user, a selection of at least one chatroom to share an SNS activity performed through the anonymous profile in the list of chatrooms, and displaying information on the SNS activity in the selected chatroom.

The displaying of the information on the SNS activity in the selected chatroom may include displaying the information on the SNS activity in the form of a rich feed distinct from a speech balloon in a chat display region of the selected chatroom.

The displaying of the information on the SNS activity in the selected chatroom may include displaying, in response to an input of the user, the information on the SNS activity in the form of a list in a pre-allocated region of the selected chatroom.

The method may further include displaying, in response to an input of selecting the rich feed, an interface for providing the SNS activity.

According to another aspect, there is provided a server for providing information on an SNS activity to a chatroom, the server including a processor configured to provide an SNS for each of a plurality of anonymous profiles created to be interlinked with an account for an IMS, receive information on an SNS activity performed through a first anonymous profile selected corresponding to a chatroom of the IMS, among the plurality of anonymous profiles of a user participating in the chatroom, and provide the information on the SNS activity performed through the first anonymous profile to the chatroom.

The processor may be configured to, if the profile of the user selected corresponding to the chatroom is changed from the first anonymous profile to a second anonymous profile, receive information on an SNS activity performed through the second anonymous profile, and provide the information on the SNS activity performed through the second anonymous profile to the chatroom.

A terminal of a participant participating in the chatroom may provide the information on the SNS activity to the chatroom, by displaying the received information on the SNS activity in the form of a rich feed distinct from a speech balloon in a chat display region of the chatroom.

A terminal of a participant participating in the chatroom may provide the information on the SNS activity to the chatroom, by displaying the received information on the SNS activity in the form of a list in a pre-allocated region of the chatroom.

According to another aspect, there is provided a method of providing an SNS, performed by a user terminal, the method including receiving a selection of at least one of a plurality of anonymous profiles interlinked with a general profile being set when subscribing an IMS provided by the user terminal, recognizing contents to be registered through interlinking to the selected anonymous profile, transmitting the contents and the selected anonymous profile to a server, and receiving a result of registering the contents in the server in the form of being interlinked with the selected anonymous profile.

The IMS may provide chatrooms, and the selected anonymous profile may be currently in use to participate in at least one of the chatrooms. The chatroom participated in using the anonymous profile may be an open chatroom to be participated in through link information.

The IMS may provide a plurality of chatrooms, and any one of the general profile and the anonymous profile may be currently in use to participate in any one of the plurality of chatrooms.

The general profile may correspond to information on an account of a user, and the anonymous profile may not expose the information on the account of the user.

The method may further include providing a list of chatrooms that are currently participated in using the selected anonymous profile and that allow information on the contents to be shared, among all chatrooms created on the user terminal, receiving a selection of a chatroom to share the information on the contents in the list of chatrooms, transmitting information on the selected chatroom to the server, and posting the information on the contents to the selected chatroom.

The providing may include providing the list of chatrooms by receiving the list of chatrooms from the server, or providing, by the user terminal, the list of chatrooms by generating the list of chatrooms through a selection of at least a portion of all the chatrooms.

In the receiving, the number of selected chatrooms may be less than or equal to a predetermined number.

The information on the contents may include at least one of 1) the contents, 2) a link to a page of the server in which the contents is registered, and 3) a link to a page of the server for the selected profile.

The information on the contents may be posted in the form of a notification in a chat window of the selected chatroom, posted in the form of an utterance of the selected profile in the chat window of the selected chatroom, or posted on at least a portion of a window overlaid on the chat window.

The information on the contents may include a link to a page of the server in which the contents is registered, and summary information extracted from the page.

The method may further include receiving the information on the contents from the server after the transmitting.

The contents may include information on the selected profile. The contents may be newly created, or selected from among contents stored in advance.

The method may further include receiving counterpart contents belonging to an anonymous profile of a counterpart, receiving a feedback on the counterpart contents, and transmitting, to the server, information on the feedback and information on the selected anonymous profile.

The method may further include receiving a request for switching the selected anonymous profile in a state while the user terminal provides an open chatroom, providing a list of selectable anonymous profiles, receiving a selection of any one in the list of anonymous profiles, and switching an anonymous profile of a message uttered in the open chatroom to the newly selected anonymous profile.

According to another aspect, there is provided a method of providing an SNS, performed by a server, the method including creating a plurality of anonymous profiles interlinked with a general profile being set when a user subscribes an IMS provided by the server, receiving contents and information on an anonymous profile selected by the user, among the plurality of anonymous profiles, and registering the contents in the form of being interlinked with the selected anonymous profile.

According to example embodiments, it is possible to provide a plurality of anonymous profiles interlinked with an account for an IMS.

According to example embodiments, it is possible to provide information on SNS activities performed using an anonymous profile created to be interlinked with an account for an IMS, to a chatroom of the IMS.

According to example embodiments, it is possible to provide an anonymous profile created to be interlinked with an account for an IMS, and information on SNS activities performed using the profile together.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
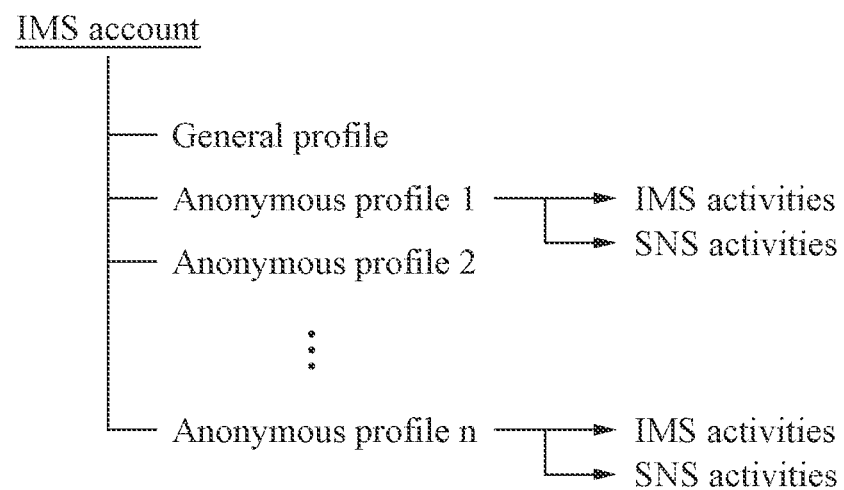
FIG. 1 illustrates services provided using profiles created to be interlinked with an account for an instant messaging service (IMS) according to an example embodiment.

The following structural or functional descriptions are exemplary to merely describe the example embodiments, and the scope of the example embodiments is not limited to the descriptions provided in the present specification.

Terms, such as first, second, and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected". "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The example embodiments may be implemented as various types of products such as, for example, a personal computer, a laptop computer, a tablet computer, a smart phone, a television, a smart home appliance, an intelligent vehicle, a kiosk, and a wearable device. Hereinafter, example embodiments will be described in detail with reference to the accompanying drawings. In the drawings, like reference numerals are used for like elements.

FIG. 1 illustrates services provided using profiles created to be interlinked with an account for an instant messaging service (IMS) according to an example embodiment.

Referring to FIG. 1, an IMS may provide real-time online communication to two or more users who have installed the same instant messenger. The instant messenger may be a messenger application, and the IMS may be a service that delivers messages between users having accounts for the IMS on the messenger application.

The IMS may include a user and a server as the main agents. The user may be a client of the IMS. The user may access the server through a terminal on which the messenger application is installed.

The terminal of the user, hereinafter, the user terminal, may be one of electronic devices such as a computer, an ultra-mobile PC (UMPC), a workstation, a net-book, a personal digital assistant (PDA), a portable computer, a web tablet, a wireless phone, a mobile phone, a smart phone, an e-book, a portable multimedia player (PMP), a portable game console, a navigation device, a black box and a digital camera, and may include all user devices capable of installing and executing a messenger application provided by the server. Under the control of the messenger application, the user terminal may perform overall service operations such as service screen setting, data input, data transmission and reception, and data storage.

The server may serve as a service platform for providing the IMS to clients. The user may subscribe the IMS provided by the server through the messenger application and create an account for the IMS. The user may create a general profile and a plurality of anonymous profiles interlinked with the account for the IMS. Herein, the term "anonymous" may refer to "anonymity-based". The general profile may show information on the account for the IMS to users who are in a predetermined relationship (for example, friends) with the user and show only limited information to users who are not in the predetermined relationship. The information on the account for the IMS may include at least one of an ID, a phone number, and an email address of the user. An anonymous profile may not be the profile showing the information on the account for the IMS, but may be a profile that shows information set by the user through link information irrespective of whether or not another user is in the predetermined relationship with the user. Hereinafter, the anonymous profile may be referred to as an open profile.

Link information of the open profile may be used to support a service for 1:1 chat with the open profile. In this example, the open profile may have link information corresponding to a 1:1 open chatroom. The open chatroom refers to a chatroom to be participated in through link information, irrespective of whether or not a counterpart is a friend in the messenger application.

The link information may be information on a link to the 1:1 open chatroom. For example, the link information may be in the form of custom URL scheme, http URL, QR code, highlighted text, icon, or the like. The Custom URL Scheme may be in the form of link information to execute the application. The http URL may be in the form of link information to a predetermined web page. The QR code is a two-dimensional barcode representing information in a black and white grid pattern, and may include, for example, information linking to a predetermined web page. The highlighted text may be in the form of text in which, however, the entirety or a portion of the text is deformed, and may include link information to a predetermined web page. The icon refers to a pictogram represented by a symbolic picture to help a user to easily recognize an object, facility, form, or concept, and may include information linking to a predetermined web page.

The general profile and the plurality of anonymous profiles may be interlinked to a single account for the IMS and managed by the server (for example, an instant message server).

The IMS may provide a plurality of open profiles interlinked with the account for the IMS. The user may perform an activity associated with the IMS (hereinafter, the IMS activity) and an activity associated with a social networking service (SNS)(hereinafter, the SNS activity) using each open profile. Hereinafter, the IMS activity and the SNS activity may be construed as different concepts. For example, the IMS activity may include an activity for exchanging information or chatting with another user in real time or semi-real time through a chatroom participated in by the user using the general profile or an anonymous profile, and the SNS activity may include activities of posting or editing contents or providing a feedback on previously posted contents through a posting space (for example, a posting space corresponding to the anonymous profile) which is distinct from the chatroom.

Further, the IMS activity and the SNS activity may be independently performed using respective open profiles. For example, an IMS activity using a first anonymous profile may be performed separately from an IMS activity using a second anonymous profile.

IMS activities may be to participate in a chatroom and perform real-time online communication in the chatroom. A chatroom may be a virtual space created on the instant message server such that two or more users may participate therein and exchange instant messages. The chatroom may include an anonymous chatroom. The anonymous chatroom may be a chatroom to be participated in through link information. The anonymous chatroom may be a chatroom to be participated in through link information irrespective of whether or not a counterpart is a friend in the messenger application. Hereinafter, the anonymous chatroom may be referred to as an open chatroom.

The open chatroom may be distinct from a normal chatroom for chatting with users who are generally friends. The open chatroom may be a 1:1 open chatroom for performing a 1:1 chat or a group open chatroom in which three or more users may participate. Users may participate in the open chatroom using open profiles.

Since link information is assigned or issued when an open chatroom and an open profile are created, the server may limit a request for 1:1 chat through an open profile of a counterpart in a 1:1 open chatroom to prevent link collision. The server may also limit a change of the open profile in the 1:1 chatroom created through the link information assigned to the open profile. However, even in this example, an open profile of a participant unrelated to the link information of the chatroom may be changed to another open profile.

The SNS activity may include at least one of an activity of the user posting contents using the open profile on a posting space (for example, a profile page of the open profile) corresponding to the open profile, an activity of editing the posted contents using the open profile, and an activity of providing a feedback on the posted contents using the open profile. The contents may include at least one of text, audio, photo, and video. The contents may also be referred to as posts, and an activity of posting contents may be referred to as posting.

The user may create a plurality of anonymous profiles interlinked with the account for the IMS. In addition, the user may perform SNS activities (for example, posting) using each open profile, and a record of the activities performed using the open profile may be displayed in the chatroom being participated in using the open profile. Further, the user may perform an IMS activity and an SNS activity while changing the open profile. Hereinafter, IMS activities and SNS activities that may be performed using a plurality of open profiles interlinked with an account for an IMS will be described.

Figure 2:
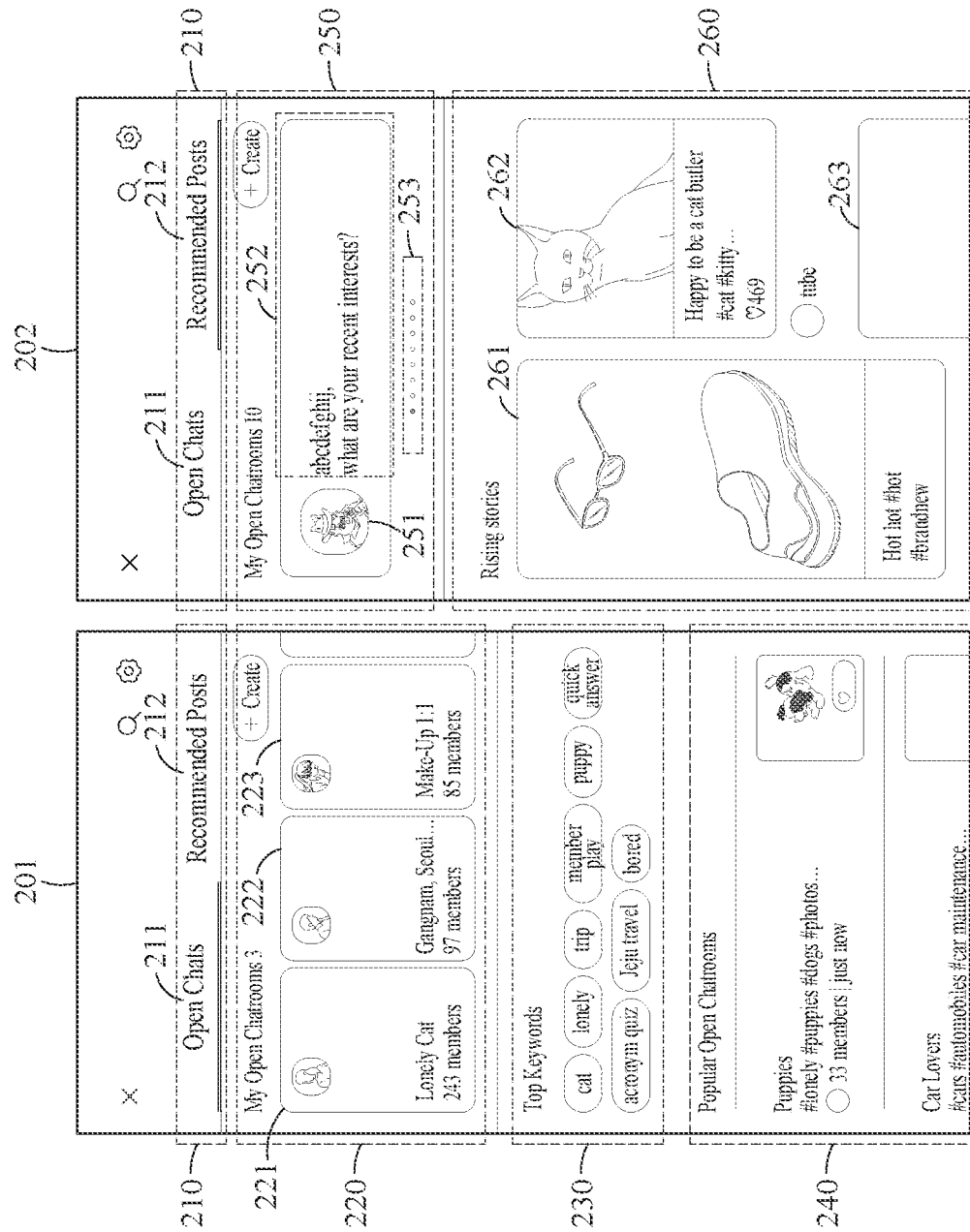
FIG. 2 illustrates examples of an open chat page and a recommended post page in an interface for an IMS of a user terminal according to an example embodiment.

FIG. 2 illustrates examples of an open chat page and a recommended post page in an interface for an IMS of a user terminal according to an example embodiment.

Referring to FIG. 2, an interface for an IMS of a user terminal may include a first page 201 associated with an open chat and a second page 202 associated with SNS activities performed using an open profile. Hereinafter, the first page 201 may be referred to as an open chat page, and the second page 202 may be referred to as a recommended post page.

The user terminal may display the open chat page 201 in response to an input of selecting an open chat tab 211 in a region 210 of the interface for the IMS, and display the recommended post page 202 in response to an input of selecting a recommended post tab 212.

The open chat page 201 may include a first region 220, a second region 230, and a third region 240. The user terminal may display a list of at least one open chatroom created by a user account for the IMS, using the first region 220 of the open chat page 201. For example, in response to an input of swiping in a predetermined direction (for example, leftward) in the first region 220, the user terminal may display, sequentially according to a predetermined order, not only currently displayed open chatrooms 221 to 223 but also undisplayed open chatrooms. The predetermined order may include at least one of the temporal order in which the open chatrooms are created, the order in which events occur most recently in the open chatrooms (for example, the temporal order in which instant messages are received), the order according to the number of participants in the open chatrooms, and the order according to authorities if the user has predetermined authorities (for example, a leader or a subleader) in the open chatrooms. The method of displaying the list of open chatrooms is not limited to the examples described above, and various methods may be employed. The open chatrooms displayed in the first region 220 may include open chatroom created using open profiles as well as open chatrooms created using a general profile. An open chatroom may be created using a general profile. However, even in this example, the general profile may not be used as is. Instead, only a portion of the information on the general profile (for example, a profile photo and a profile name) may be extracted and used. In doing so, even when a user creates or participates in an open chatroom using a general profile, it is possible to prevent personal information (for example, a phone number) on the general profile from being known through the open chatroom.

The user terminal may display, using the second region 230 on the open chat page 201, recommended keywords determined by a predetermined method, among keywords associated with anonymous chatrooms provided through the IMS. For example, a server may determine, to be the recommended keywords, keywords having been searched more than a threshold search amount or increment amount by users of anonymous chats of the IMS within a predetermined period, among the keywords associated with the anonymous chatrooms.

The user terminal may display, using the third region 240 on the open chat page 201, recommended open chatrooms determined by a predetermined method, among open chatrooms provided through the IMS. For example, the recommended open chatrooms are popular open chatrooms, and may be determined by the server according to predetermined criteria.

The recommended post page 202 may include a first region 250 and a second region 260. The user terminal may display a list of at least one open profile created to be interlinked with a user account, using the first region 250 of the recommended post page 202. The list of open profiles may show the open profiles according to a predetermined order such as the order in which the open profiles are created. For example, the user terminal may display one open profile at a time in the first region 250, and display the open profiles one by one according to the predetermined order in response to an input of swiping the displayed open profile in a predetermined direction (for example, leftward). Further, the user terminal may display the order of the open profiles through a region 253. The method of displaying the list of open profiles is not limited to the examples described above, and various methods may be employed. An open profile may include a region 251 in which the profile photo is displayed, and a region 252 in which a text that induces posting is displayed. The user terminal may additionally create an open profile interlinked with the user account, in response to an input of selecting "+Create" in the first region 250.

In response to an input of selecting any one open profile in the list of open profiles, the user terminal may display an interface for providing an SNS through the selected open profile.

As an example, in response to an input of selecting the region 251 on the open profile, the user terminal may display a cover-view interface of the selected open profile. In detail, when the user selects the region 521 on the open profile, the user terminal may display the cover-view interface (for example, 301) of the selected open profile. The cover-view interface will be described further below with reference to FIG. 3.

As another example, in response to an input of selecting the region 252, the user terminal may display an interface for performing an SNS activity using the open profile interlinked with the user account. For example, the interface for performing an SNS activity may be an interface for posting contents (for example, a post creating interface 401).

The user terminal may display, using the second region 260 on the recommended post page 202, a list of recommended activities determined by a predetermined method, among SNS activities associated with open profiles of the users of the anonymous chats of the IMS. For example, the SNS activities may include an activity of posting contents, and the list of recommended activities may be a list of recommended contents determined according to predetermined criteria, among posted contents and may also be referred to as "recommended feeds".

The server may determine the recommended feeds for each category, and the user terminal may display feeds belonging to a predetermined category using the second region 260. For example, the user terminal may display, using the second region 260, feeds associated with a predetermined category, such as "Housekeeping Tips", "Real-Time Recommended Posts", and "We Draw". The user terminal may change and display the recommended feeds according to predetermined criteria. In detail, the user terminal may change and display the recommended feeds at every predetermined time (for example, 30 seconds), or may change and display the recommended feeds in response to a refreshing input of the user. Further, the user terminal may display categories of recommended feeds on the recommended post tab 212 in the region 210. If the recommended feeds are changed, what is displayed on the recommended post tab 212 may also be changed.

Figure 3:
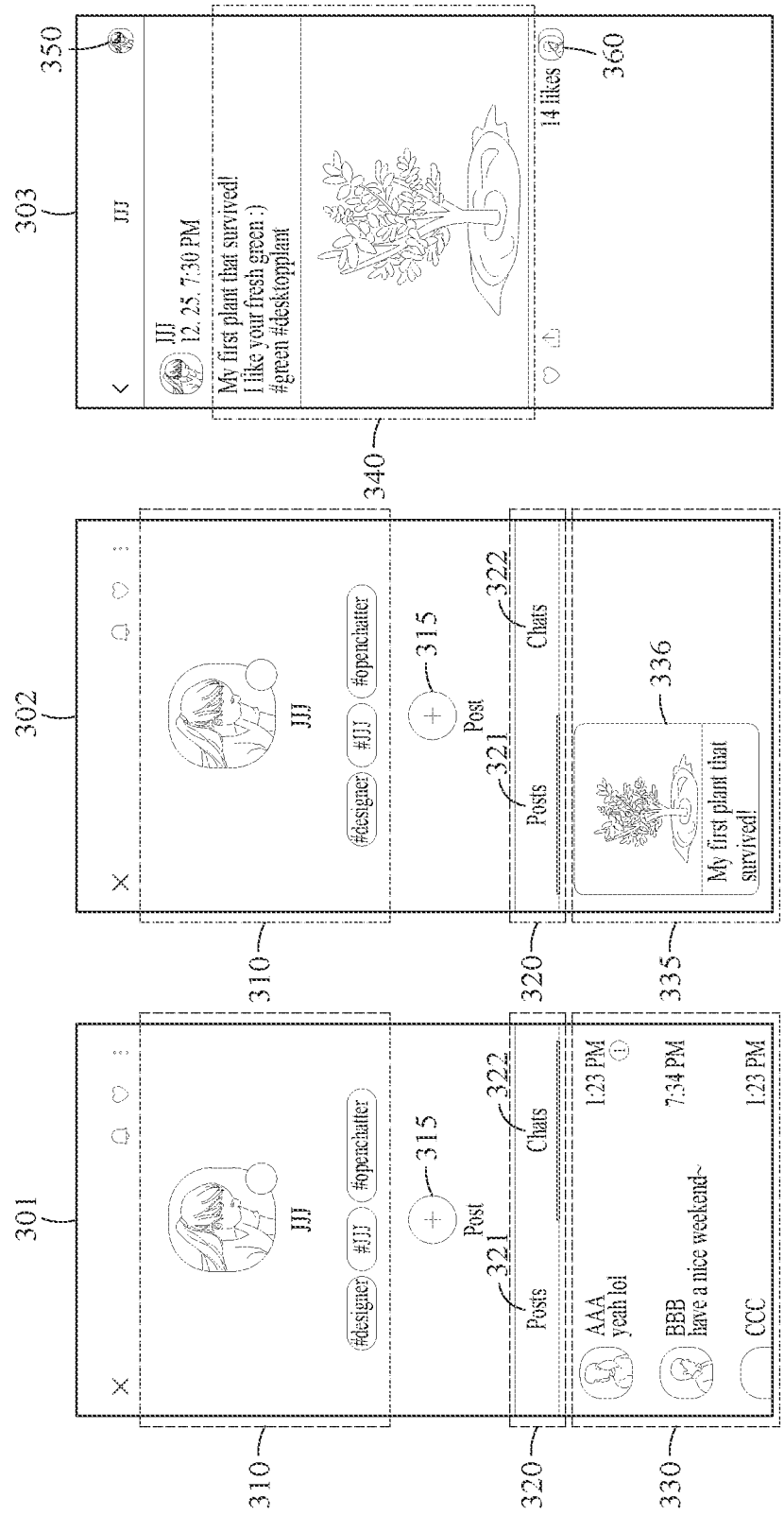
FIG. 3 illustrates an example of an interface for performing social networking service (SNS) activities on a user terminal according to an example embodiment.

FIG. 3 illustrates an example of an interface for performing SNS activities on a user terminal.

Referring to FIG. 3, a user terminal may display a cover-view interface 301, 302. As described above, in response to an input of selecting the region 251 on the open profile, the user terminal may display the cover-view interface 301, 302 of the selected open profile (the open profile interlocked with a user account of the user). The cover-view interface 301, 302 of the open profile interlocked with the user account of the user may be distinct from a cover-view interface 602 of an open profile interlocked with a user account of another user. The cover-view interface 602 of the open profile interlocked with the user account of another user will be described below with reference to FIG. 6.

The cover-view interface may be an interface for displaying profile information of the selected open profile. The cover-view interface may include a first region 310, a second region 335, a third region 330, and a fourth region 315. The user terminal may display information on the selected open profile using the first region 310 in the cover-view interface. The information on the open profile may include a profile image, a profile nickname, and hashtags associated with the profile and may be optionally set by the user.

The user terminal may display the second region 335 of the cover-view interface in response to an input of selecting a posting tap 321 in a region 320 of the cover-view interface, and display the third region 330 of the cover-view interface in response to an input of selecting a chatting tap 322.

The user terminal may display a list of chatrooms of the IMS currently participated in using the selected open profile, using the third region 330 of the cover-view interface. The chatrooms in the list of chatrooms may be 1:1 open chatrooms created using the open profile. In the third region 330, the list of all chatrooms currently participated in using the selected open profile may not be displayed, and instead, only a list of 1:1 chatrooms created through link information assigned to the selected open profile may be displayed. Other users subscribing the IMS may request a 1:1 chat for an open profile of a specific user. In this example, a 1:1 open chatroom may be created between a requester and the open profile through link information assigned to the open profile. The requester may select one of his/her own open profiles when requesting a 1:1 chat for the open profile.

The user terminal may display, sequentially according to a predetermined order, not only the currently displayed chatroom but also undisplayed chatrooms, in response to an input of swiping on the third region 330 in a predetermined direction (for example, upward). The predetermined order may include at least one of the temporal order in which the open chatrooms are created, the order in which events occur most recently in the open chatrooms (for example, the temporal order in which instant messages are received), the order according to the number of participants in the open chatrooms, and the order according to authorities if the user has predetermined authorities (for example, a leader or a subleader) in the open chatrooms. The method of displaying the list of chatrooms of the IMS is not limited to the examples described above, and various methods may be employed.

In response to an input of selecting the fourth region 315 of the cover-view interface, the user terminal may display an interface for performing an SNS activity using the selected open profile. In detail, in response to an input of selecting the fourth region 315 of the cover-view interface, the user terminal may display an interface (for example, the post creating interface 401) for posting contents using the selected open profile.

The user terminal may display a list of SNS activities performed through the selected to open profile, using the second region 335 of the cover-view interface. For example, the user terminal may display content 336 posted through the selected open profile, using the second region 335 of the cover-view interface. If a plurality of contents are posted through the selected open profile, the user terminal may display, sequentially according to a predetermined order, not only the currently displayed content 336 but also undisplayed chatrooms, in response to an input of swiping in a predetermined direction (for example, upward) on the second region 335. The method of displaying the list of SNS activities is not limited to the examples described above, and various methods may be employed.

In response to an input of selecting any one SNS activity in the list of SNS activities displayed using the second region 335, the user terminal may display an interface for displaying the selected SNS activity. The interface for displaying an SNS activity may be a post detail interface 303 for displaying contents posted using the open profile. For example, in response to an input of selecting the posted content 336 in the second region 335, the user terminal may display the post detail interface 303 for displaying the selected content.

The post detail interface 303 may include a first region 350, a second region 360, and a third region 340. The user terminal may display the details of contents using the third region 340 of the post detail interface 303. The user terminal may display an open profile to be used to provide a feedback on the selected SNS activity using the first region 350 of the post detail interface 303. For example, the user terminal may display an open profile for inquiring and evaluating the selected content 336 using the first region 350, among the plurality of open profiles.

The user terminal may display information on the feedback on the selected SNS activity using the second region 360 of the post detail interface 303. For example, the user terminal may display information on the feedback on the selected content 336 using the second region 360 of the post detail interface 303. The information on the feedback may include at least one of an icon for providing an evaluation (for example, "like" or "heart" icon), an index for evaluation (for example, the number of "like"s), and a list of open profiles providing an evaluation (for example, a list of open profiles clicking "like").

Further, in response to an input of selecting the first region 350, the user terminal may display an interface for changing, to any one of the plurality of open profiles, the open profile to be used to provide a feedback. For example, the user terminal may display an interface for providing the list of open profiles in response to an input of selecting the first region 350, and change the open profile to be used to provide a feedback in response to an input of selecting any one of the plurality of open profiles. A default open profile displayed before changing the open profile to be used to provide a feedback is changed may be determined by predetermined criteria. For example, if the user is currently viewing a post through a chatroom, an open profile currently used in the chatroom, the most recently created open profile, or the last selected open profile may be determined to be the default open profile.

The user may provide a feedback on selected content for each open profile currently selected. For example, the user may click a "like" icon for the selected content using the first open profile, change the first open profile to the second open profile by selecting the first region 350, and then click the "like" icon again using the second open profile. In this example, the user terminal may display both the first open profile and the second open profile in the list of open profiles providing an evaluation.

Figure 4:
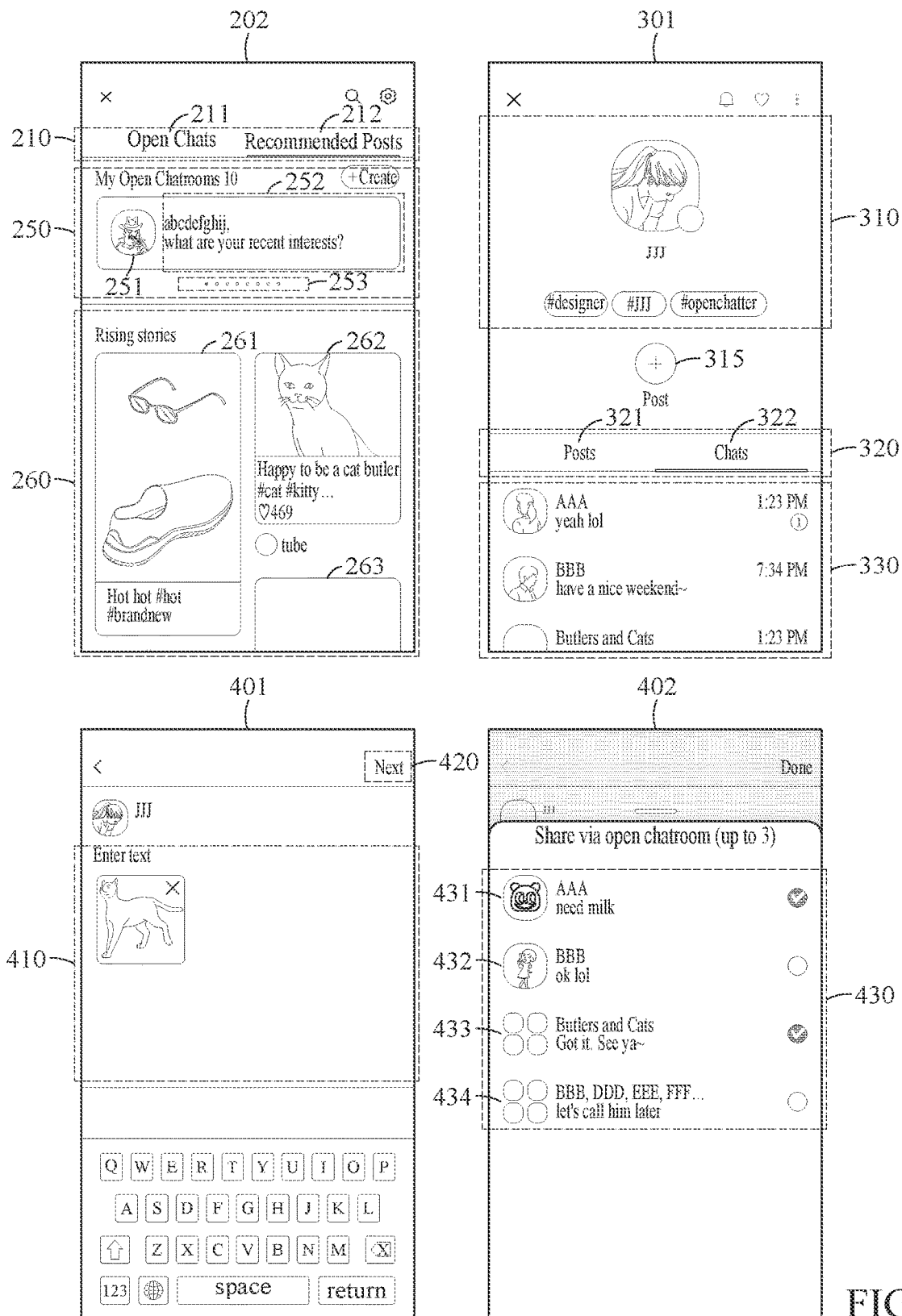
FIG. 4 illustrates an example of sharing information on an SNS activity in a chatroom according to an example embodiment.

FIG. 4 illustrates an example of sharing information on an SNS activity in a chatroom according to an example embodiment.

Referring to FIG. 4, contents may be posted on a posting space corresponding to an open profile using the open profile created to be interlinked with an account for an IMS, and information on such an activity may be provided to a chatroom of the IMS. For example, a user may post contents on the posting space corresponding to an open profile using the open profile created to be interlinked with an account for the IMS and then share the contents and information on the contents in a chatroom. Even if there is no sharing request directly from the user, information on an SNS activity may be provided to the chatroom. As described above, the SNS activity may include at least one of an activity of the user posting contents using the open profile on a posting space corresponding to the open profile, an activity of editing the posted contents using the open profile, and an activity of providing a feedback on the posted contents using the open profile.

Hereinafter, an example of posting contents on a posting space corresponding to an open profile using the open profile created to be interlinked with an account for an IMS and then sharing the contents in a chatroom will be described. In response to an input of selecting the region 252, the user terminal may display an interface for performing an SNS activity using the open profile interlinked with the user account. For example, the interface for performing an SNS activity may be an interface for posting contents (for example, a post creating interface 401).

In response to an input of selecting the region 251 on the open profile, the user terminal may display a cover-view interface of the selected open profile. In response to an input of selecting the fourth region 315 of the cover-view interface, the user terminal may display an interface for performing an SNS activity using the selected open profile. In detail, in response to an input of selecting the fourth region 315 of the cover-view interface, the user terminal may display an interface (for example, the post creating interface 401) for posting contents using the selected open profile.

The post creating interface 401 may include a first region 410 and a second region 420. The user terminal may display the created contents using the first area 410. In response to an input of selecting the second region 420, the user terminal may display an interface 402 for sharing created contents in open chatrooms.

The user terminal may display a list of open chatrooms participated in using the open profile through a first region 430 in the interface 402 for sharing created contents in open chatrooms. In response to an input of selecting at least one open chatroom in the list of open chatrooms, the user terminal may display the contents and information on posting of the contents in the selected chatroom. For example, the user terminal may display open chatrooms 431 to 434 participated in using the open profile through the first region 430 in the interface 402 for sharing in open chatrooms, and in response to an input of selecting the chatroom 431 and the chatroom 433, display the contents and the information on posting of the contents in the chatroom 431 and the chatroom 433. The information on posting of the contents will be described in detail below with reference to FIG. 5.

Figure 5:
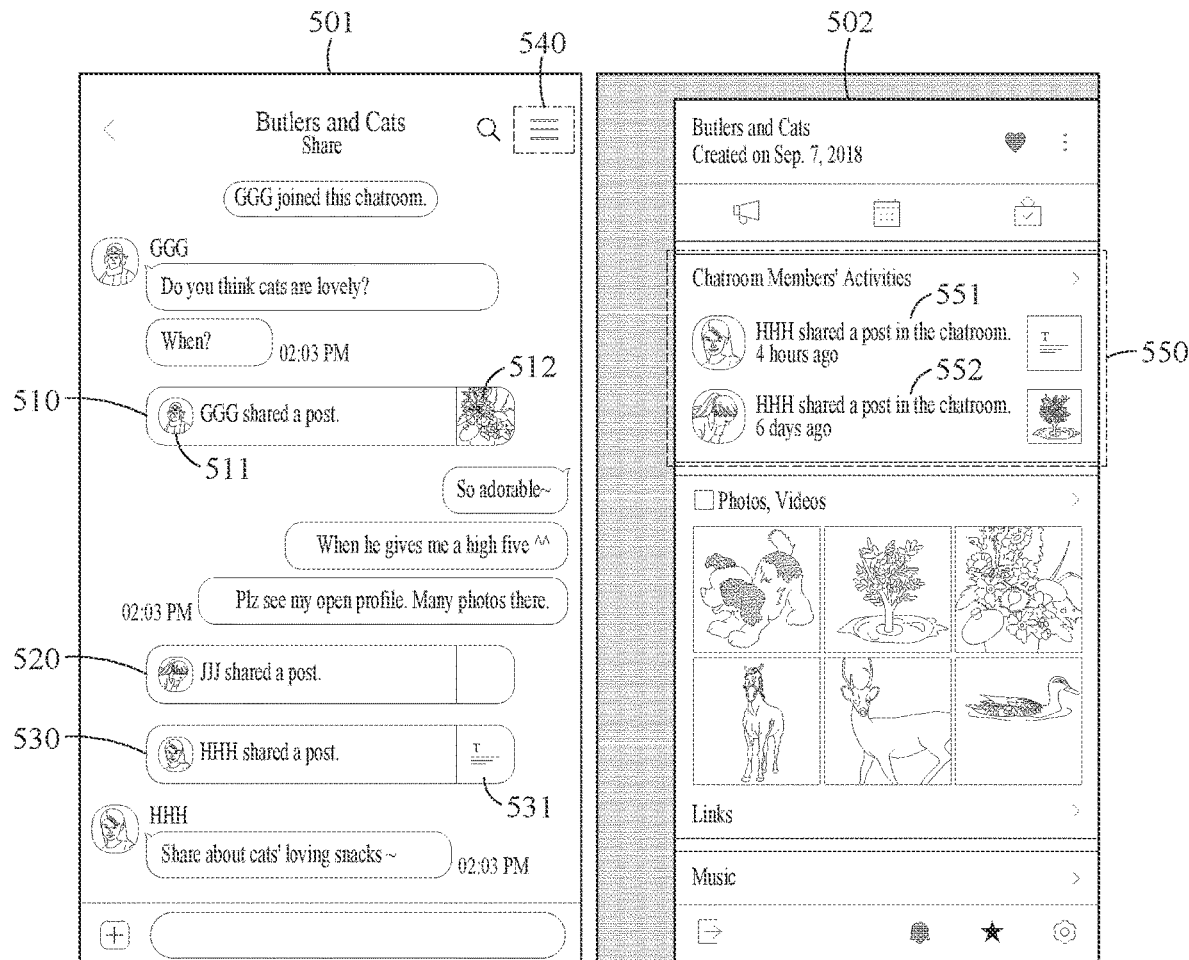
FIG. 5 illustrates an example of an interface for displaying information on an SNS activity in a chatroom according to an example embodiment.

FIG. 5 illustrates an example of an interface for displaying information on an SNS activity in a chatroom according to an example embodiment.

Referring to FIG. 5, for each participant participating in a chatroom using an open profile, a user terminal may display, in the chatroom, information on an SNS activity performed through a first open profile selected corresponding to the chatroom by the participant, the first open profile being selected from among a plurality of open profiles of the participant. The information on the SNS activity may include at least one of profile information of each first open profile, a link to access the SNS activity, and a thumbnail of the SNS activity.

For example, the user terminal may display the information of the SNS activity performed through the first open profile, among the plurality of open profiles of the corresponding user, in the form of a rich feed distinct from a speech balloon. In detail, the user terminal may display the information on posting of contents performed through the first open profile in the form of a rich feed 510, 520, 530 in a chatroom 501. The rich feed is distinct from speech balloons showing conversation between participants of the chatroom, and may be, for example, in the form like a feed used when someone enters or leaves the chatroom.

The rich feed may include at least one of a region for displaying a profile photo of a first open profile being a target of the rich feed, a region for displaying a thumbnail of an SNS activity performed using the first open profile, and a region for displaying a description about the SNS activity. For example, the rich feed 510 may include a region 511 for displaying a profile photo of the first open profile being a target of the rich feed, and a region 512 for displaying a thumbnail of an SNS activity performed using the first open profile. Also, referring to a thumbnail region 531 of the rich feed 530, the thumbnail may also include a text as well as a photo. In response to an input of selecting the rich feed, the user terminal may display a post detail interface corresponding to the rich feed.

Alternatively, the user terminal may display information of SNS activities performed through first open profiles selected corresponding to the chatroom by respective participants participating in the chatroom using open profiles, in the form of a list in a pre-allocated region of the chatroom. For example, in response to an input of selecting a region 540 of the chatroom 501, the user terminal may display the information on posting of the contents performed through the first open profiles in the form of a list of feeds 551 and 552 in a side menu region 550 of an interface 502.

Although not shown in the drawing, a user participating in the chatroom may change his/her own profile in the chatroom. For example, a user participating in a chatroom using a first open profile may change his/her own profile to a second open profile in the chatroom. In this example, SNS activities performed through the first open profile may not be displayed in the chatroom any further. Instead, SNS activities performed through the second open profile may be displayed in the chatroom.

When the open profile selected corresponding to the chatroom is changed, the newly selected second open profile may be applied even to a record of the previous conversation on a chat log of the chatroom. However, an open profile used to perform an SNS activity may be applied as is to the SNS activity displayed in the form of a rich feed or already shared through a separate region. In detail, the content previously shared as an activity of the first profile does not change to be an activity of the second open profile.

Depending on the type or importance of an activity of the open profile, information on the activity may not be displayed in the form of a rich feed and may be displayed only through a separate region. For example, an activity such as editing hashtag information of a specific open profile may not be displayed in the form of a rich feed not to impede the continuity of the chat log. However, even in this example, the activity may be displayed through a separate region.

Figure 6:
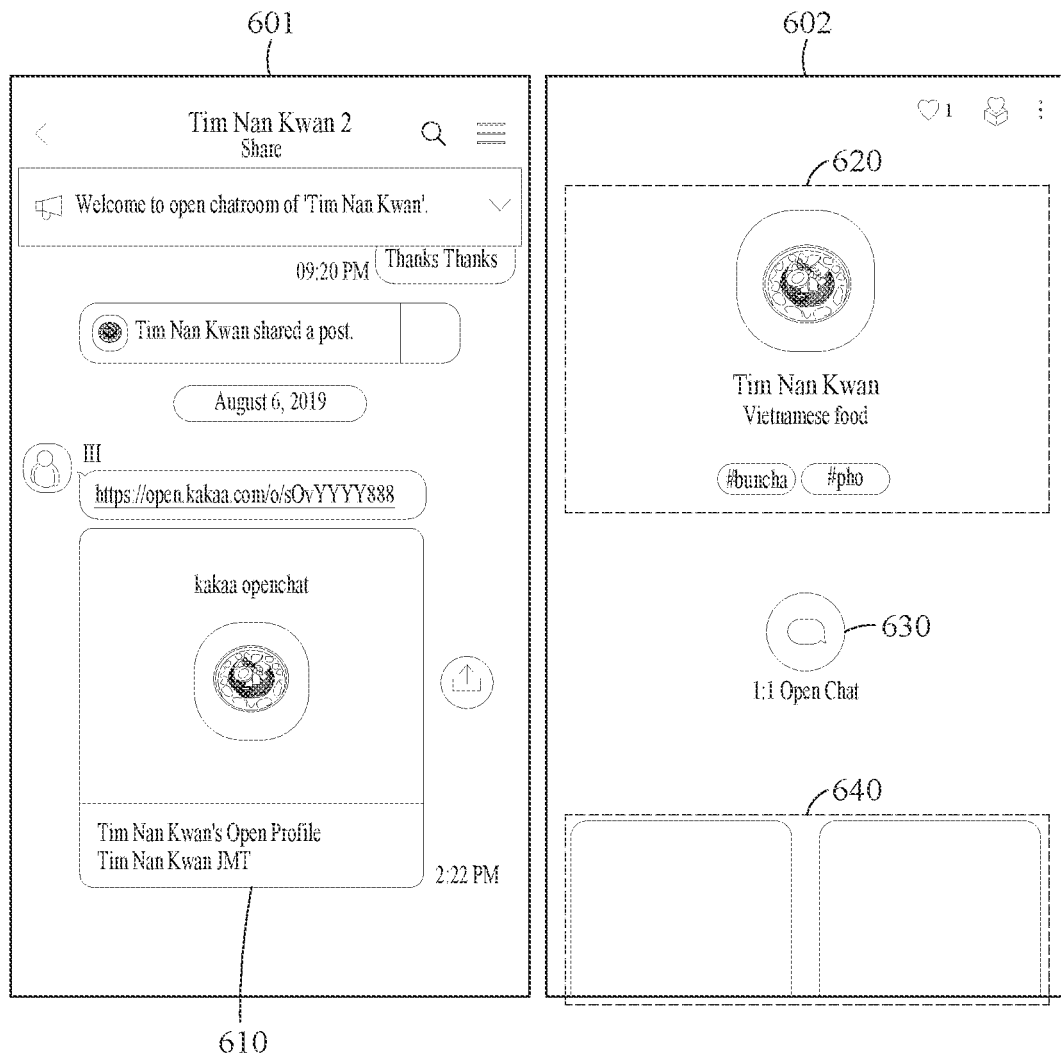
FIG. 6 illustrates an example of an interface for displaying information on an open profile in a chatroom according to an example embodiment.

FIG. 6 illustrates an example of an interface for displaying information on an open profile in a chatroom according to an example embodiment.

Referring to FIG. 6, a user terminal may display, in a chatroom, information on an open profile as well as information on an SNS activity performed through the open profile. For example, a server may receive a request for sharing information on at least one open profile, among a plurality of profiles of users participating in a chatroom. The user terminal may display, in a chatroom 601, information 610 on the open profile in response to an information sharing instruction for the open profile from the server. The information 610 on the open profile may include at least one of link information and a profile photo of the open profile.

In response to an input of selecting the information 610 on the open profile, the user terminal may display a cover-view interface of the open profile. For example, the user terminal may display, in the chatroom 601, the information 610 on at least one open profile other than that of the user, among the plurality of profiles of the users participating in the chatroom. In response to an input of selecting the information 610 on the open profile, the user terminal may display a cover-view interface 602 of an open profile interlinked with a user account of another user.

The cover-view interface of the open profile interlinked with the user account of the other user (hereinafter, referred to as a cover-view interface of another account) may include a first region 310, a second region 335, and a third region 330. The user terminal may display information on the open profile using a first region 310 in the cover-view interface of the other account. The information on the open profile may include a profile image, a profile nickname, and a hashtag associated with the profile.

In response to an input of selecting a second region 630 in the cover-view interface of the other account, the user terminal may display an interface for providing a 1:1 general chat with the corresponding open profile.

The user terminal may display a list of SNS activities performed through the selected open profile, using a third region 640 of the cover-view interface of the other account. For example, the user terminal may display content posted through the open profile, using the third region 640 in the cover-view interface of the other account. If a plurality of contents are posted through the open profile, the user terminal may display, sequentially according to a predetermined order, not only the currently displayed content but also undisplayed open chatrooms, in response to an input of swiping on the third region 640 in a predetermined direction (for example, upward). The method of displaying the list of SNS activities is not limited to the examples described above, and various methods may be employed.

In response to an input of selecting any one SNS activity in the list of SNS activities displayed using the second region 335, the user terminal may display an interface for displaying the selected SNS activity. The interface for displaying an SNS activity may be a post detail interface 303 for displaying contents posted using the open profile. For example, in response to an input of selecting the posted content in the third region 640, the user terminal may display the post detail interface 303 for displaying the selected content.

Figure 7:
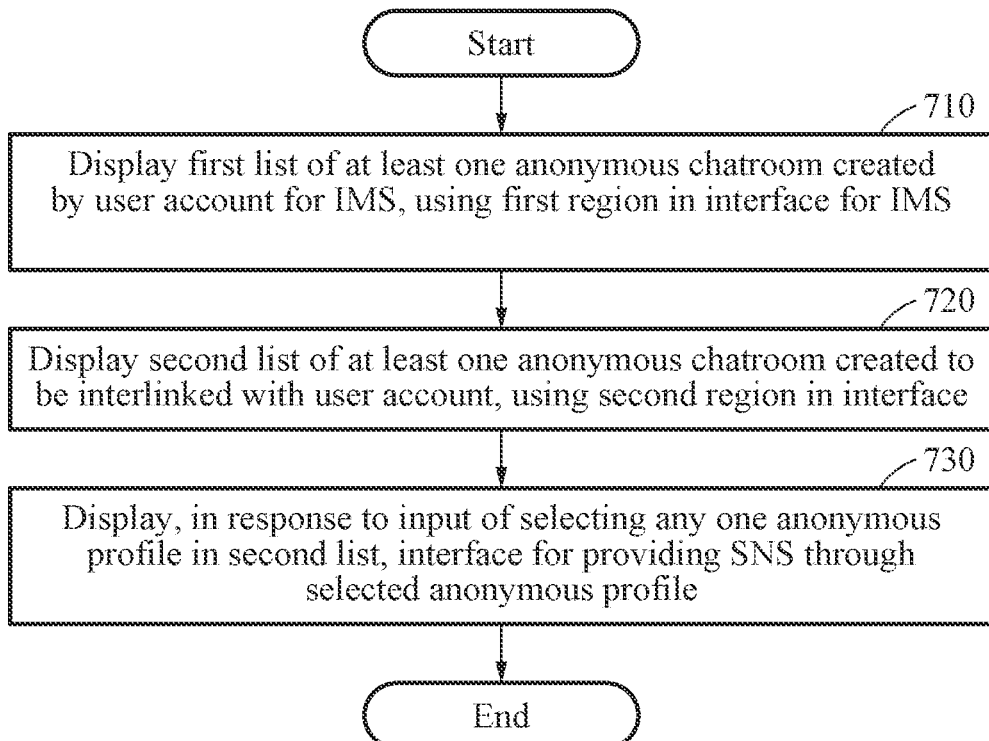
FIG. 7 is a flowchart illustrating a method of displaying an interface for providing an SNS through an anonymous profile, performed by a user terminal, according to an example embodiment.

FIG. 7 is a flowchart illustrating a method of displaying an interface for providing an SNS through an anonymous profile, performed by a user terminal, according to an example embodiment.

Referring to FIG. 7, operations 710 to 730 may be performed by the user terminal described with reference to FIGS. 1 to 6.

In operation 710, a user terminal provides a first list of at least one anonymous chatroom created by a user account for an IMS, using a first region on a first page in an interface for the IMS. In operation 720, the user terminal displays a second list of at least one anonymous profile created to be interlinked with the user account, using a first region on a second page in the interface for the IMS. Although not shown in the drawings, the first region on the first page and the first region on the second page may be different regions disposed on the same page.

As described above, each of the at least one anonymous chatroom may be assigned link information. The link information may be shared in an IMS, an SNS, or in various other manners, and other users may access the corresponding anonymous chatroom provided by the IMS by selecting the shared link information. Further, each of the at least one anonymous profile may also be assigned link information. In this example, the link information assigned to each of the at least one anonymous profile may include link information of an anonymous chatroom for chatting with the corresponding anonymous profile in the form of a 1:1 chat.

In operation 730, the user terminal displays, in response to an input of selecting any one anonymous profile in the second list, an interface for providing an SNS through the selected anonymous profile. For example, the user terminal may immediately display a page for posting contents using the selected anonymous profile, and display an interface for sharing the contents posted through the page in the chatroom currently participated in using the selected anonymous profile. In this example, shareable chatrooms may include only chatrooms created through link information assigned to the selected anonymous profile.

Figure 8:
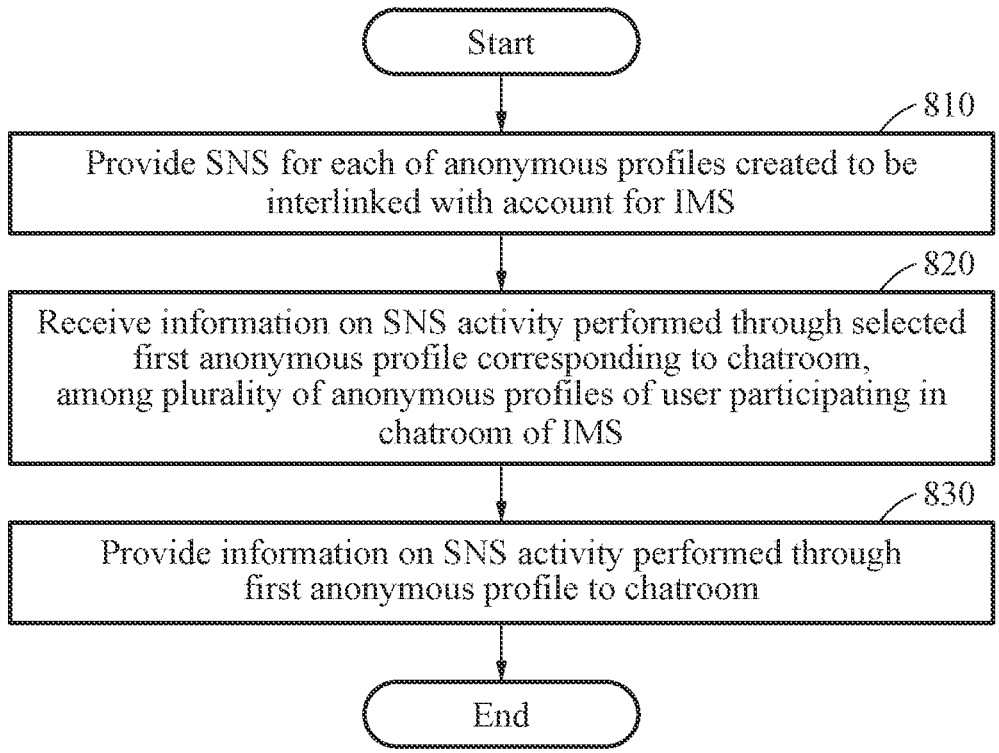
FIG. 8 is a flowchart illustrating a method of providing information on an SNS activity in a chatroom, performed by a server, according to an example embodiment.

FIG. 8 is a flowchart illustrating a method of providing information on an SNS activity in a chatroom, performed by a server, according to an example embodiment.

Referring to FIG. 8, operations 810 to 830 may be performed by the server described above.

In operation 810, the server provides an SNS for each of a plurality of anonymous profiles created to be interlinked with an account for an IMS.

In operation 820, the server receives information on an SNS activity performed through a first anonymous profile selected corresponding to a chatroom of the IMS, among the plurality of anonymous profiles of a user participating in the chatroom.

In operation 830, the server provides the information on the SNS activity performed through the first anonymous profile to the chatroom.

Although not shown in the drawing, if the profile of the user selected corresponding to the chatroom is changed from the first anonymous profile to a second anonymous profile, the server may not provide information on SNS activities performed through the first anonymous profile to the chatroom. Instead, the server may receive information on SNS activities performed through the second anonymous profile and provide the information on the SNS activities performed through the second anonymous profile to the chatroom.

The server may extract participants participating in the chatroom and transmit the information on the SNS activities to terminals of the participants. The terminals of the participants may display the received information on the SNS activities in the form of rich feeds distinct from speech balloons in a chat display region of the chatroom. Alternatively, the terminals of the participants may display the received information of the SNS activities in the form of a list in a pre-allocated region of the chatroom.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A control method of a server providing a social networking service (SNS) based on at least one anonymous profile, the control method comprising:
   receiving a request for creating a first anonymous profile from a first user terminal;
   creating the first anonymous profile;
   assigning link information to the first anonymous profile; and
   creating at least one chatroom which is accessible through the link information assigned to the first anonymous profile and is a chatroom for 1:1 chat with the first anonymous profile,
   wherein a detail interface for the first anonymous profile outputted on the first user terminal provides interest data being set for the first anonymous profile and a list of the at least one chatroom participated in using the first anonymous profile.

2. The control method of claim 1, wherein the link information is information to be shared by the first user terminal with another user terminal.

3. The control method of claim 2, further comprising:
   replying, if a request corresponding to the link information is received from a second user terminal with which the link information is shared, to the second user terminal with information on the first anonymous profile.

4. The control method of claim 3, wherein the information on the first anonymous profile is interest data being set for the first anonymous profile.

5. The control method of claim 4, wherein the interest data include at least one of a hashtag and a post associated with the first anonymous profile.

6. The control method of claim 5, wherein the detail interface for the first anonymous profile is outputted on the second user terminal, and
   the interest data are included in the outputted detail interface.

7. The control method of claim 1, wherein posts included in the interest data on the outputted detail interface are displayed in arrangement in an order of being associated with interest data being set for the first anonymous profile.

8. The control method of claim 1, wherein a chat creating request through the first anonymous profile is made by a user input through a detail interface for the first anonymous profile.

9. A method of providing a social networking service (SNS), performed by a user terminal based on at least one anonymous profile, the method comprising:
   transmitting a request for creating a first anonymous profile to an SNS providing server; and
   outputting a detail interface for the created first anonymous profile,
   wherein the detail interface includes interest data being set for the first anonymous profile, and
   a list of at least one anonymous chatroom which is accessible through link information assigned to the first anonymous profile and is a chatroom for 1:1 chat with the first anonymous profile.

* * * * *